US009665756B2

(12) United States Patent
Huang et al.

(10) Patent No.: US 9,665,756 B2
(45) Date of Patent: May 30, 2017

(54) METHOD AND DEVICE FOR PROCESSING VISUAL GRAPHIC CODES OF MOBILE TERMINAL

(71) Applicants: BEIJING QIHOO TECHNOLOGY COMPANY LIMITED, Beijing (CN); QIZHI SOFTWARE (BEIJING) COMPANY LIMITED, Beijing (CN)

(72) Inventors: Liqiang Huang, Beijing (CN); Haiyin Shen, Beijing (CN); Zhaochun Song, Beijing (CN); Jiankai Zhao, Beijing (CN)

(73) Assignees: Beijing Qihoo Technology Company Limited, Beijing (CN); Qizhi Software (Beijing) Company Limited, Beijing (CN)

( * ) Notice: Subject to any disclaimer, the term of this patent is extended or adjusted under 35 U.S.C. 154(b) by 0 days.

(21) Appl. No.: 14/896,370

(22) PCT Filed: Jun. 4, 2014

(86) PCT No.: PCT/CN2014/079164
§ 371 (c)(1),
(2) Date: Dec. 4, 2015

(87) PCT Pub. No.: WO2014/194825
PCT Pub. Date: Dec. 11, 2014

(65) Prior Publication Data
US 2016/0125214 A1    May 5, 2016

(30) Foreign Application Priority Data
Jun. 5, 2013    (CN) .......................... 2013 1 0222425

(51) Int. Cl.
*G06K 19/06* (2006.01)
*G06K 7/10* (2006.01)
*H04N 5/232* (2006.01)

(52) U.S. Cl.
CPC ...... *G06K 7/10722* (2013.01); *G06K 7/10811* (2013.01); *H04N 5/23212* (2013.01); *H04N 5/23293* (2013.01)

(58) Field of Classification Search
CPC .......... G06K 19/06; G06K 19/00; G06K 7/10; G06F 17/00
(Continued)

(56) References Cited

U.S. PATENT DOCUMENTS

2004/0099741 A1* 5/2004 Dorai ................. G06K 7/14
235/462.08
2005/0178842 A1* 8/2005 Hepworth .......... G06K 7/10722
235/472.01

(Continued)

FOREIGN PATENT DOCUMENTS

CN    1822693 A    8/2006
CN    1924899 A    3/2007
(Continued)

*Primary Examiner* — Edwyn Labaze
(74) *Attorney, Agent, or Firm* — Baker & Hostetler LLP (57) ABSTRACT

The invention discloses a method and device for processing visual graphics codes of mobile terminal. The method mainly includes: monitoring an action of shooting or recording digital images by the mobile terminal; identifying a focusing action during the process of shooting or recording the digital images by the mobile terminal; recording the digital images obtained after the mobile terminal finishes the focusing action; analyzing the digital images obtained after the focusing action is finished, and obtaining visual graphics codes in the digital images; decoding the visual graphics codes, and processing decoded information obtained after decoding. The invention can efficiently and conveniently (Continued)

obtain the visual graphics coding of the digital images caused by the focusing action, and avoid complicated operations of re-installing a visual graphics coding software, and opening the visual graphics coding software by the user.

18 Claims, 7 Drawing Sheets

(58) Field of Classification Search
USPC .............................. 235/492, 375, 487, 472.01
See application file for complete search history.

(56) References Cited

U.S. PATENT DOCUMENTS

| | | | | |
|---|---|---|---|---|
| 2010/0048242 | A1* | 2/2010 | Rhoads | G06F 17/30244 455/556.1 |
| 2012/0205436 | A1* | 8/2012 | Thomas | G06K 17/0025 235/375 |
| 2012/0256007 | A1* | 10/2012 | Cok | G06K 19/06056 235/494 |
| 2013/0048710 | A1* | 2/2013 | Marsico | G06F 17/30879 235/375 |
| 2013/0112751 | A1* | 5/2013 | Maurer | G06K 19/06046 235/454 |
| 2015/0302421 | A1* | 10/2015 | Caton | G06Q 30/018 705/17 |

FOREIGN PATENT DOCUMENTS

| | | |
|---|---|---|
| CN | 101051341 A | 10/2007 |
| CN | 101702752 A | 5/2010 |
| CN | 102136058 A | 7/2011 |
| CN | 102982302 A | 3/2013 |
| CN | 103279730 A | 9/2013 |
| CN | 103366149 A | 10/2013 |
| JP | 2012-094158 A | 5/2012 |

* cited by examiner

METHOD AND DEVICE FOR PROCESSING VISUAL GRAPHIC CODES OF MOBILE TERMINAL

This application is a continuation of International Application No. PCT/CN2014/079164, filed Apr. 6, 2014, which is based upon and claims priority to Chinese Patent Application No. CN201310222425.2, filed May 6, 2013, the entire content of which are incorporated herein by reference.

FIELD OF THE INVENTION

The present invention relates to the technical field of visual graphics coding, particularly relates to a method and a device for processing the visual graphics codes of a mobile terminal.

BACKGROUND OF THE INVENTION

Two-dimensional codes belong to one type of the visual graphics codes, which use a special geometrical figure to record data symbol information onto the image which is distributed in black-and-white alternation on a plane surface (i.e. in two dimensions) according to a particular pattern. In consideration of coding, the two-dimensional codes handily utilize the concept of "0", "1" bit stream which constitutes the internal logic basis of a computer, use several geometrical figures which are corresponding to the binary system to present information of character value, and realize the automatic process of information by the automatically identification of an image input device or a photonic scanning device.

The two-dimensional codes can store different information, mainly comprising: web site addresses, name cards, character information, special codes, etc. The two-dimensional codes become a new way of information recording and a convenient network gateway, and are gradually and widely used.

Now in the prior art, a method of obtaining two-dimensional codes from a mobile terminal, such as a cell phone, mainly comprises: downloading and installing an identification software of the two-dimensional codes from the network by a mobile terminal, such as a cell phone; executing the identification software of the two-dimensional codes in the mobile terminal, such as a cell phone, when running into a figure which comprises the two-dimensional codes; and placing the two-dimension codes of the figure within the two-dimensional codes scanning area of the identification software, acquiring the two-dimensional codes information of said figure by said identification software.

Disadvantages of the method of obtaining two-dimensional codes from a mobile terminal, such as a cell phone are: the method requires the people to download and install a two-dimensional code identification software to the mobile terminal, such as a cell phone, the procedure of which is complicated. The method needs the two-dimensional codes in the figure to be placed within the two-dimensional codes scanning area of the identification software, and needs focusing the two-dimensional codes of the figure. Since many of the identification software of the two-dimensional codes lacks a function of auto focusing, the operation of two-dimensional codes identification could be easily failed.

SUMMARY OF THE INVENTION

In consideration of this problem, the present invention is raised to provide a method for processing the visual graphics codes of a mobile terminal and a corresponding device for processing the visual graphics codes of a mobile terminal, which may overcome or at least partially overcome the problem.

According to one aspect of the present invention, a method for processing the visual graphics codes of a mobile terminal is provided, comprising:

monitoring an action of shooting or recording digital images by the mobile terminal;

identifying a focusing action during the process of shooting or recording the digital images by the mobile terminal;

recording the digital images obtained after the mobile terminal finishes the focusing action;

analyzing the digital images obtained after the focusing action is finished, and obtaining visual graphics codes in the digital images;

decoding the visual graphics codes, and processing decoded information obtained after decoding.

According to another aspect of the present invention, a device for processing visual graphic codes of a mobile terminal is provided, comprising:

a monitor module, configured to monitor an action of shooting or recording digital images by the mobile terminal;

an identification module, configured to identify a focusing action during the process of shooting or recording the digital images by the mobile terminal;

a record module, configured to record the digital images obtained after the mobile terminal finishes the focusing action;

an analysis module, configured to analyse the digital images obtained after the focusing action is finished, and to obtain visual graphics codes in the digital images;

a process module, configured to decode the visual graphics codes, and to process the decoded information obtained after decoding.

According to the above technical solution, through monitoring and identifying the focusing action in the process of shooting or recording digital images by a mobile terminal, the digital images obtained after the mobile terminal finishes the focusing action can be recorded and analyzed, so that the visual graphics codes in the digital images obtained correspondingly by the focusing action can be efficiently and conveniently acquired and processed. The present invention avoids the weakness of complicated operation of decoding user visual graphics codes, and provides a quick and efficient way to realize auto identifying and decoding the solution of visual graphics codes in the digital images, so as to simplify the actions where the user needs to execute special software and to manually take a photo of the visual graphics codes by the user. Meanwhile, the present invention makes improvements on the problems, such as the identification operation of the visual graphics codes becomes easily un-successful. Through processing clear images obtained after the focusing action is finished, and extracting the visual graphics codes, the identification rate and accuracy of the visual graphics codes are increased.

The above description is only a summary of the present technical solution, in order to make the person skilled in the art to clearly understand the technical means of the present invention, and to exploit the present invention according to the contents of the specification, and to more easily understand the above and other purposes, features, and advantages of the present invention, the embodiments of the present invention are particularly raised as follows.

BRIEF DESCRIPTION OF THE DRAWINGS

By reference to the following detailed description on optimized embodiments, other advantages and beneficial effects of this invention are clear to the person skilled in the art. The drawings are used to indicate the optimized embodiments, and shall not be considered as a limit to this invention. In all the drawings, the same component is indicated by one symbol. In the drawings.

DETAILED DESCRIPTION OF THE EMBODIMENTS

Exemplary embodiments of this disclosure are described in detail by reference to the drawings. Although preferred embodiments are shown in the drawing, it shall be understood that this disclosure shall not be limited by the described embodiment thereof. On contrary, those embodiments are provided to make this disclosure be more thoroughly understood, and to provide complete extent of this disclosure to the person skilled in the art.

Embodiment 1

Figure 1:
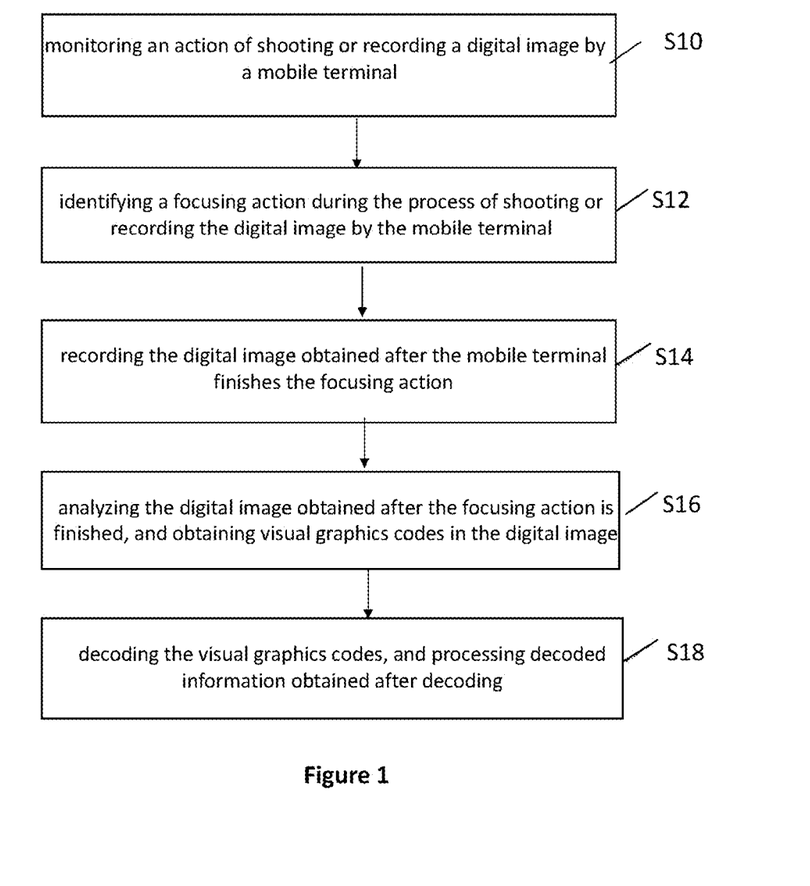
FIG. 1 shows a processing flow chart of the method for processing visual graphics codes by a mobile terminal according to embodiment 1 of the present invention.

The present embodiment provides a processing flow chart of the method for processing visual graphics codes by a mobile terminal as shown in FIG. 1, comprising the following steps:

S10, monitoring an action of shooting or recording digital images by a mobile terminal;

monitoring whether the mobile terminal starts a shooting or recording task; and/or monitoring the process of shooting or recording by the mobile terminal.

For example, executing the corresponding application program of the recording device; or the corresponding memory space of the recorded object (such as the size of a video is changing, which indicates that the picture recording is ongoing), etc.

Said digital images comprise videos or pictures. Wherein, the video can be a video recorded with a predetermined time length, when a focusing finishes.

S12, identifying a focusing action during the process of shooting or recording the digital images by the mobile terminal;

said focusing actions comprise: a focusing action to a designated focus; or auto focusing. Finishing a focusing action could be auto determined by the program which finalizes shooting or recording the digital images by the mobile terminal, and could also be manually determined by a user. Also, "after finishing a focusing action" comprises the same time when finishing the focusing action.

Identifying whether a marking event of the focusing action appears during the process of shooting or recording the digital images. If such event appears, then determining that the focusing action is caused during the process of shooting or recording the digital images by the mobile terminal. Said marking event can be an audio mark which represents a successful focusing in the recording software, or a graphics mark which appears on the screen, etc. or, identifying whether the focusing information confirmed by the user is received during the process of shooting or recording the digital images. If such information is received, then determining that the focusing action is caused during the process of shooting or recording the digital images by the mobile terminal.

S14, recording the digital images obtained after the mobile terminal finishes the focusing action; informing the shooting or recording device to shoot or record the objects after the focusing action finishes, and storing the corresponding digital images; or, storing the digital images obtained after the shooting or recording device finishes the focusing action; or, grasping the digital images from the screen of the shooting or recording device after it finishes the focusing action, and storing the digital images.

S16, analyzing the digital images obtained after the focusing action is finished, and obtaining visual graphics codes in the digital images.

Said visual graphics codes comprise two-dimensional codes, bar codes, etc.

Detecting whether a positioning graphics of the visual graphics codes exists in the digital images obtained after the focusing action is finished; if the positioning graphics exists, then obtaining locating information of the visual graphics codes according to the locating information of the positioning graphics; according to the locating information of the visual graphics codes, extracting the visual graphics codes from the digital images.

Said process of analyzing can be finalized at the side of the mobile terminal, and can also be finalized at the side of the server.

When the digital images are a video, said analyzing the digital images obtained after the focusing action is finished also comprises: resolving the video obtained after the focusing action is finished, and obtaining the resolved video frames; when sending the video dataflow to the server, transmitting all the videos after the recording is finished; or transmitting the videos while the recording is ongoing.

Concretely, the visual graphics codes in the obtained digital images are the visual graphic codes obtained from the resolved several video frames.

S18, decoding the visual graphics codes, and processing decoded information obtained after decoding.

Decoding said visual graphics codes, and obtaining the decoded information after decoding;

classifying the decoded information, and processing the decoded information according to the classification of the decoded information.

Processing the decoded information according to said classification of the decoded information and/or calling the corresponding program according to said decoded information. The concrete processing procedure comprises:

presenting the decoded information through the display window of said mobile terminal.

storing the decoded information into the designated database of said mobile terminal.

Processing the decoded information by an application program carried in the mobile terminal or an external application program.

Sending said decoded information to the server, and receiving a security certificate result of said decoded information returned from the server.

When the classification of the encoded information is information of merchandise, sending the bar codes of the merchandise to the server; and when the security certificate information of said merchandise returned from the server is received, displaying the basic information and security certificate information of said merchandise on the display window.

When the classification of the decoded information is URL information, sending said web site information to the server by the mobile terminal, so that said server can detect whether said URL information has gone through a security certificate by a network shield technology. When the said URL information returned by the server comprises the security certificate information which has been gone through, opening a website by a browser; when the said URL information returned by the server does not comprise the security certificate information which has been gone through, not opening a website.

When the classification of the decoded information is name card information, determining whether the internal address list saved in the mobile terminal comprises the contact information of the name card. If the terminal comprises, then not adding said contact information into the address list; otherwise, obtaining different basic information comprised in said contact information, adding different types of basic information into the address list through a one-touch operation.

Sending said contact information to the server, obtaining other relevant information of the contact person than the name card from the internet by the server according to the information of the contact person. After receiving other relevant information returned from said server, displaying said basic information of the contact person together with other relevant information through the display window.

When obtaining text information from said decoded information, calling a text editor of the mobile terminal and opening said text information by the text editor;

When obtaining Wi-Fi information from said decoded information, calling a Wi-Fi connecting program from the system by the mobile terminal, and using the contents provided in the Wi-Fi information to connect designated Wi-Fi hotspots.

When obtaining a phone number from the decoded information, calling a dialling program by the mobile terminal, and filling in said phone number into the number input frame.

When obtaining short message information from the decoded information, calling a short message management program by the mobile terminal, and filling in corresponding contents of said short message information into the places of the receiver and contents of the short message to be sent.

When obtaining mail information from the decoded information, calling a mail administrative program by the mobile terminal, and filing in corresponding contents of said mail information into the places of the receiver and contents of the mail.

Embodiment 2

Opening the camera of the cell phone, and taking a photo of two-dimensional codes, identifying the codes manually, and conducting subsequent processing, are operations which mostly comply with a user habit. Based on these customary operations, the present invention provides a method of processing the visual graphics codes by a mobile terminal, wherein an identification device of two-dimensional codes and a photographic device are set in the mobile terminal, and the photographic device is monitored by the identification device of two-dimensional codes.

Said mobile terminal may comprise mobile telecommunication terminals or tablets or digital cameras etc. Raising a mobile telecommunication terminal as an example of a mobile terminal, and two-dimensional codes as an example of visual graphics codes, details of the present application are described as follows.

Figure 2:
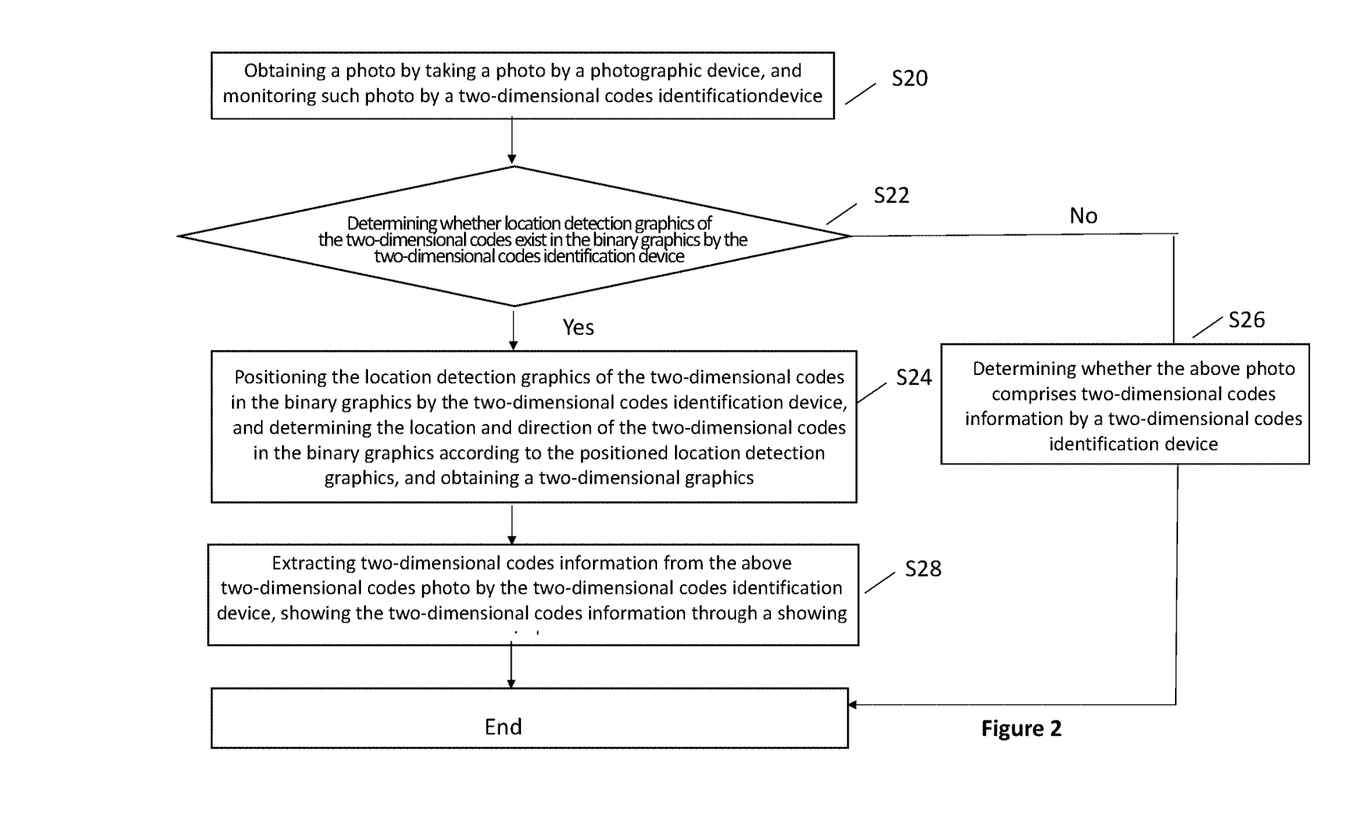
FIG. 2 shows a processing flow chart of the method for processing two-dimensional codes by a mobile telecommunication terminal according to embodiment 2 of the present invention.

A processing steps of the method for processing two-dimensional codes by a mobile telecommunication terminal as shown in FIG. 2, comprising the following steps:

Step S20 are obtaining a photo by taking a photo by a photographic device, and monitoring such photo by a two-dimensional codes identification device.

Opening both said photographic device and two-dimensional codes identification device in the mobile communication device. Meanwhile, starting the two-dimensional codes identification device to monitor said photographic device. In the present invention, said two-dimensional codes identification device may adopt the one of the following three ways of monitoring to monitor said photographic device:

The way of monitoring 1: the two-dimensional codes identification device conducts real time monitoring of the corresponding picture file of the photographic device. When monitoring that a new picture file is added to the stored address, the two-dimensional codes identification device will regard the new picture file as a monitored picture file.

Regarding the embedded operation system based on a Linux inner core, an application layer can monitor the operation added to the file system, which belongs to the Linux inner core (of course, other operation systems also have such character, only with a different API (Application Programming Interface)), such as operations of read, write, or create files, etc.

Said two-dimensional codes identification device directly monitors the events of reading and writing of the file system. When the photographic device successfully takes photos, the camera will create a picture file, and store the picture file to the storage address of the corresponding picture file of the photographic device. Said two-dimensional device monitors such picture file through the API.

In comparison with a polling mode, this way of monitoring has obvious advantages. Firstly, when there is not any photo taking, CPU resource will not be consumed, which saves the CPU resource. Secondly, it has a good real time.

When the event happens, a notification can be received at a level of milliseconds. In comparison with a polling mode, if the period is very short, such as 100 milliseconds, then the CPU is greatly consumed. If the period is too long, such as 3 seconds, then the delay is obvious.

One of the corresponding coding of this way of monitoring provided in this embodiment lies in:

```
         File target = Environment.DIRECTORY_DCIM;
    File dir =
Environment.getExternalStoragePublicDirectory(target);
    int flags = FileObserver.CLOSE_WRITE;
    LocalFileObserver ob = new LocalFileObserver(path, flags);
    ob.startWatching( );
  class LocalFileObserver extends FileObserver {
    @Override
    public void onEvent(int event, String path) {
         // processing
    }
```

The way of monitoring 2: the two-dimensional codes identification device conducts real time monitoring of the system activities of the mobile terminal. When monitoring that the photographic device finishes the procedure of activities of starting, taking photos, storing pictures, the two-dimensional codes identification device takes the picture files newly stored by the photographic device as the monitored picture files.

Regarding an Andriod operation system, it has a system module of Activity administrator. Activity administrator administrates the activities of all the events (i.e. graphical user interface of the system, i.e. the GUI element). The activity of taking a photo of the system camera is also an independent Activity.

Whenever the Activity is on or off, the Activity administrator will send notifications to all the observers registered with the Activity administrator. Wherein, said notification contents comprise on, stop, change, and etc. of the Activity.

Said two-dimensional codes identification device registers to the Activity administrator as an observer, and receives all the notification events sent by the Activity administrator. Said two-dimensional codes identification device determines whether the system camera finishes the procedure of activities of starting, taking photos, and storing pictures according to the received all Activity event notifications.

One of the corresponding coding of this way of monitoring provided in this embodiment lies in:

The way of monitoring 3: the two-dimensional codes identification device conducts real time monitoring of the system activities of the mobile terminal. When the display screen of the photographic device is monitored as on, and the picture of the display screen is maintained for a certain duration (such as 5 seconds), the two-dimensional codes identification device will regard the photo in the display screen as a monitored picture file. This way of monitoring can identify the two-dimensional codes photo when the user has not yet taken the photo.

Regarding the embedded operation system based on a Linux inner core, the display screen device has a buffer of a bitmap. The buffer is open to the application of root authority (the highest authority).

Through the way of user authority, said two-dimensional codes identification device obtains a root authority, and reads the screen device buffer by API. The concrete way is: obtaining a file number by the device file fb0, and calling the size and bitmap depth information of the display screen obtained by the photographic device by fcntl system, and reading each row of pixels of the display screen through said size and bitmap depth information.

One of the corresponding coding of this way of monitoring provided in this embodiment lies in:

```
FILE* fb_in;
    int fb;
    struct fb_var_screeninfo vinfo;
    char imgbuf[0x10000];
    unsigned int r, rowlen;
    unsigned int bytespp;
    // opening the screen device
    fb_in = fopen("/dev/graphics/fb0", "r");
    fb = fileno(fb_in);
    fb_in = fdopen(fb, "r");
    // reading the size and pixel information of the screen
    if(ioctl(fb, FBIOGET_VSCREENINFO, &vinfo) < 0) {
        return;
    }
    fcntl(fb, F_SETFD, FD_CLOEXEC);
    bytespp = vinfo.bits_per_pixel / 8;
    rowlen = vinfo.xres * bytespp;
for(r=0; r<vinfo.yres; r++) {
        // reading a row of pixels
        int len = fread(imgbuf, 1, rowlen, fb_in);
        if (len <= 0) break;
        // recording a row of picture Raw data
    }
fclose(fb_in);
```

```
         Class<?> amnClass =
Class.forName("android.app.ActivityManagerNative");
            Object amnObject =
    amnClass.getMethod("getDefault").invoke(null);
             if (register) {
                 Class<?> c = IActivityWatcher.class;
                 Method m =
    amnClass.getMethod("registerActivityWatcher", c);
                     m.invoke(amnObject, watcher);
            }
    private final Callback watcher = new Callback( ) {
             @Override
             public void onTopActivityChanged(ComponentName cn) {
                 if (CameraUtils.isCameraUI(cn)) {
                     // processing
                 }
            }
        }
```

The photographic device focuses the photo, and takes a photo after the focusing is determined. Said two-dimensional codes identification device monitors the photo which is just taken by said photographic device according to one of said ways of monitoring.

Step S22 are conducting a two-dimensional codes identification processing for the said photo according to the locating and graphic character information of a positioning graphics of a predetermined two-dimensional codes by said two-dimensional codes identification device, and determining whether a positioning graphics of two-dimensional codes exists in said photo. If the positioning graphics exists, then executing step S24, otherwise, executing step S26.

Said two-dimensional codes device conducts a pretreatment of said photo to obtain a binary graphics of said photo. Said pretreatment comprises decoding said photo, and conducting a format conversion, and converting said photo into a grey graphics without any compressed format, and conducting a de-noise processing, and a binary processing to said grey graphics so as to obtain a binary graphics. The binary processing of the grey graphics is to set the grey scale of the points on the graphics to 0 or 255, that is to present an obvious black and white effect of the whole graphics. That is to obtain a binary graphics which reflects the whole and partial characters of the graphics, after choosing proper threshold values of the grey graphics with 256 levels of illumination. Said binary processing can reduce unnecessary elements of said graphics, and is helpful to two-dimensional codes identification. Said way of two-dimensional codes processing may adopt the method of adaptive illumination, and etc.

Figure 3:
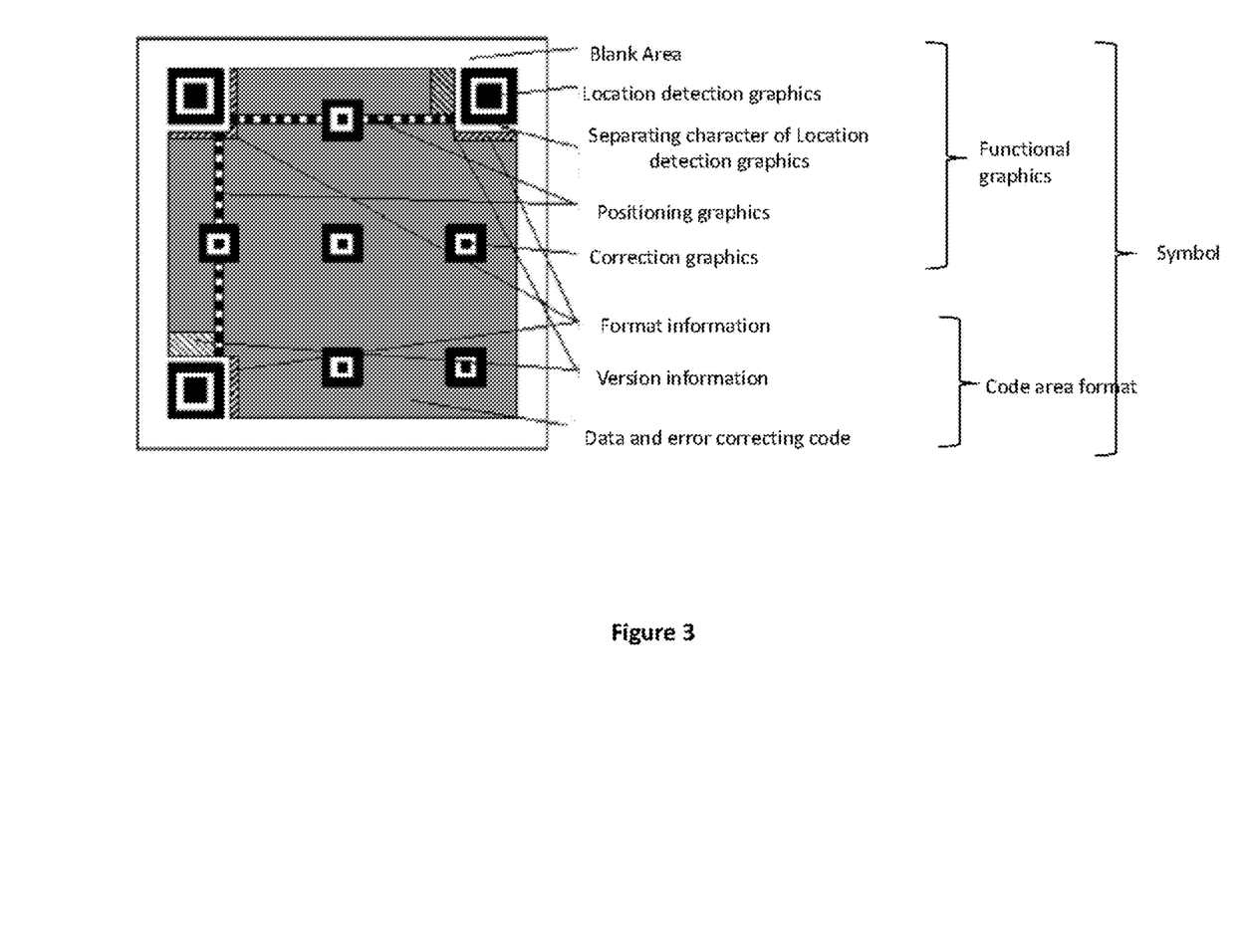
FIG. 3 shows an exemplary illustration of two-dimensional codes according to embodiment 2 of the present invention.
Figure 4:
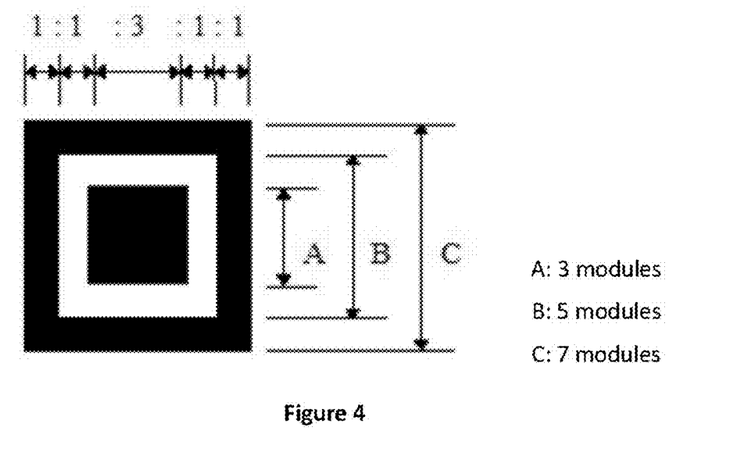
FIG. 4 shows an illustration of module sequence of a positioning graphics according to embodiment 2 of the present invention.

As shown in the FIG. 3, there are 3 same positioning graphics for location positioning which are at the top left corner, top right corner and bottom left corner of the two-dimensional codes. Each positioning graphics can be regarded as composed of 3 overlapped concentric squares. The module sequence illustration of each positioning graphics is as shown by the FIG. 4, which is composed of a sequence of dark color-light color-dark color-light color-dark color, and are 7×7 dark modules, 5×5 light modules, 3×3 dark modules. The proportion of relevant width of each module is 1:1:3:1:1, and the allowable deviation of the width of the module is 0.5 (i.e. the allowable size scope of each square of the single module is 0.5~1.5, and the allowable width scope of the square of three modules width is 2.5~3.5).

The two-dimensional codes identification device detects said binary graphics in the horizontal and vertical directions. It detects whether said binary graphics has said 3 positioning graphics of said two-dimensional codes according to the position and graphics character information of the 3 positioning graphics in said two-dimensional codes. If said binary graphics comprises said 3 positioning graphics of said two-dimensional codes, then executing step S24; otherwise, executing step S26.

Step S24 are positioning the positioning graphics of the two-dimensional codes in the binary graphics by the two-dimensional codes identification device, and determining the location and direction of the two-dimensional codes in the binary graphics according to the positioned positioning graphics, and obtaining a two-dimensional graphics.

Figure 5:
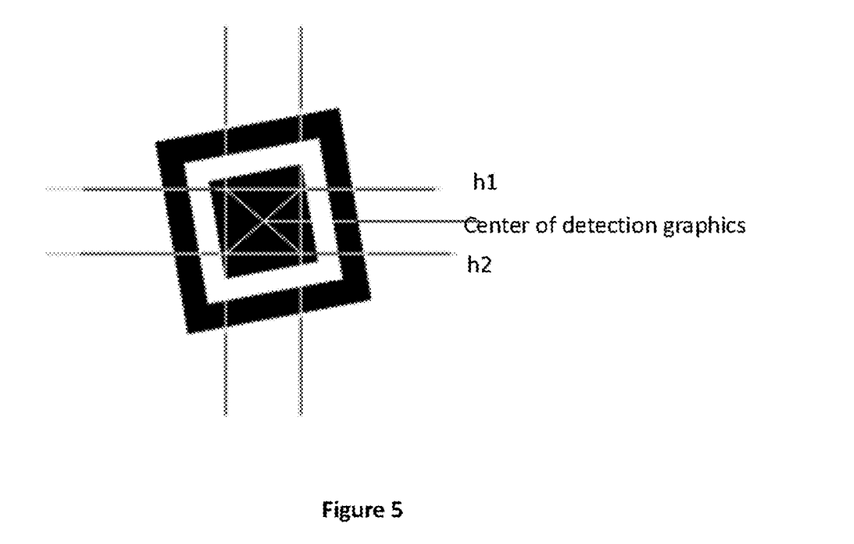
FIG. 5 shows a principle illustration of the method of determining the coordinates of the center points of location detection areas according to embodiment 2 of the present invention.

Said two-dimensional codes identification device obtains 3 location detection areas in said binary graphics by said two-dimensional codes identification device, and positions said 3 positioning graphics of the two-dimensional codes, and marks the coordinates of the center points of said 3 location detection areas. A principle illustration of the method of determining the coordinates of the center points of location detection areas is shown in the FIG. 5. The detailed procedure is as follows: with regard to the squares of the innermost layer in said each location detection area, recording the pixel lines of the outermost layer of the square in a horizontal direction, and recording the pixel lines of the outermost layer of the square in a vertical direction, and obtaining four straight lines, and picking the center of the rectangle surrounded by the four straight lines as a center point of the positioning graphics.

Obtaining the coordinates of the center points of 3 positioning graphics through this processing, when the positioning graphics is positioned, the coordinates of the center points of the two-dimensional graphics can be obtained through calculations of said coordinates of the center points of the 3 positioning graphics. A principle illustration of the determination of the direction of two-dimensional codes graphics is shown in the FIG. 6. According to the level of link, the deflection angle of the vertical direction of the center points of 3 positioning graphics, the deflection angle of the two-dimensional codes graphics can be determined. If the two-dimensional codes graphics has any geometrical change of shape change, a bilinear transform interpolation can be used for a geometrical rotating rectification of the two-dimensional codes graphics.

Figure 6:
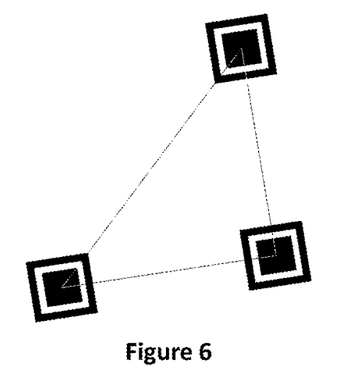
FIG. 6 shows a principle illustration of the determination of the direction of the two-dimensional codes graphics according to embodiment 2 of the present invention.

According to the coordinates of the center points of the two-dimensional codes graphics and the direction of said two-dimensional codes graphics, the two-dimensional codes graphics can be extracted.

An example of partial coding for a format transform of said graphics provided in this embodiment lies in:

```
final BitmapFactory.Options options = new BitmapFactory.Options( );
    options.inJustDecodeBounds = true;
    BitmapFactory.decodeFile(filePath, options);
    final int heightRatio = Math.round((float) height / (float) reqHeight);
    final int widthRatio = Math.round((float) width / (float) reqWidth);
    inSampleSize = heightRatio < widthRatio ? heightRatio : widthRatio;
    options.inJustDecodeBounds = false;
    return BitmapFactory.decodeFile(filePath, options);
```

The person skilled in the art can understand that the positioning graphics which are located at the at the top left corner, top right corner, and bottom left corner of the two-dimensional codes are only examples. In the real applications, said positioning graphics can also be set in other locations of the two-dimensional codes graphics. The present invention does not limit to a particular setting way for setting the positioning graphics to the two-dimensional codes. Any setting way for setting the positioning graphics to the two-dimensional codes is within the scope of protection of the present invention.

Step S28 are extracting two-dimensional codes information from said two-dimensional codes figures by said two-dimensional codes identification device, resolving the code stream of said two-dimensional codes information by a content resolver, and obtaining the comprised user information, such as names, websites, telephone numbers and companies.

An example of partial coding for resolving the code stream of said two-dimensional codes information provided in this embodiment lies in:

```
        private static final Pattern BEGIN_VCARD =
    Pattern.compile("BEGIN:VCARD", Pattern.CASE_INSENSITIVE);
    String rawText = getMassagedText(result);
    // detecting whether it is a VCARD prefix
    Matcher m = BEGIN_VCARD.matcher(rawText);
    if (m == null) {
            return;
    }
    // matching names
    List<List<String>> names = matchVCardPrefixedField("FN", rawText, true,
false);
    if (names == null) {
        names = matchVCardPrefixedField("N", rawText, true, false);
        formatNames(names);
    }
    // matching telephone numbers
    List<List<String>> phoneNumbers = matchVCardPrefixedField("TEL", rawText,
true, false);
    // matching telephone numbers
    List<List<String>> emails = matchVCardPrefixedField("EMAIL", rawText, true,
false);
    // matching addresses
    List<List<String>> addresses = match VCardPrefixedField("ADR", rawText, true,
true);
    // matching companies
    List<String> org = matchSingleVCardPrefixedField("ORG", rawText, true, true);
```

Showing the user information resolved from the two-dimensional codes information by the display window. Said display window can be a display screen of the mobile telecommunication terminal or other floating windows and etc.

An example of partial coding for starting a floating window provided in this embodiment lies in:

```
        int type = WindowManager.LayoutParams.TYPE_PHONE;
            int flags =
WindowManager.LayoutParams.FLAG_NOT_TOUCH_MODAL;
            int format = PixelFormat.RGBA_8888;
            wmlp = new WindowManager.LayoutParams(type, flags, format);
            String svc = Context.WINDOW_SERVICE;
            WindowManager wm =
(WindowManager)ctx.getSystemService(svc);
            wm.addView(view, wmlp);
    When the window is started, a from-top-to-bottom display Animation is
presented.
            TranslateAnimation animation = new TranslateAnimation(0, 0,
-wmlp.height, 0);
            animation.setDuration(300);
            v.startAnimation(animation);
```

For example, now a lot of name cards have two-dimensional codes. The present invention can be used to take a photo of the two-dimensional codes of a name card, show the identified name card information on the cell phone, and save to the cell phone contact list in one-touch operation.

Ends the process.

The step 26 are determining if said binary graphics does not comprise any two-dimensional codes information by the two-dimensional codes identification device, and ending the process.

In the real application, said two-dimensional codes identification device may manually close according to actual needs. Or, when said two-dimensional codes identification device monitors that the memory card of the mobile communication terminal is removed, and the background of the screen has been closed, the two-dimensional codes identification device will automatically turn off the monitoring program, and avoid unnecessary resource consume and improve the battery life of the mobile communication terminal.

An example of coding for auto turning off the monitoring program of the two-dimensional codes identification device provided in this embodiment lies in:

```
    // Event monitoring: result event, contact person request event
        IntentFilter filter = new IntentFilter( );
        filter.addAction(Intent.ACTION_MEDIA_MOUNTED);
        filter.addAction(Intent.ACTION_MEDIA_UNMOUNTED);
        filter.addAction(Intent.ACTION_SCREEN_OFF);
        filter.addAction(Intent.ACTION_SCREEN_ON);
        registerReceiver(mReceiver, filter);
```

```
            @Override
            public void onReceive(Context context, Intent intent) {
                if (LOGD_ENABLED) {
                    Log.d(TAG, "onReceive: action=" + intent.getAction( ));
                }
                if
(Intent.ACTION_MEDIA_MOUNTED.equals(intent.getAction( ))) {
                    mCameraMonitor.start( );
                } else if
(Intent.ACTION_MEDIA_UNMOUNTED.equals(intent.getAction( ))) {
                    mCameraMonitor.stop( );
                } else if
(Intent.ACTION_SCREEN_OFF.equals(intent.getAction( ))) {
                    mCameraMonitor.start( );
                } else if
(Intent.ACTION_SCREEN_ON.equals(intent.getAction( ))) {
                    mCameraMonitor.stop( );
```

The person skilled in the art can understand that the types of applications of the mobile terminals, such as said mobile communication terminal, or tablets or digital cameras, and etc., are merely examples. Other type of applications, which appears now or in the future, may also be comprised in the protection scope of the present invention, if they are also applicable to the embodiments of the present invention. Those applications are also comprised hereinto by reference.

A two-dimensional codes identification device and a photographing device are set in the mobile terminal. The two-dimensional codes identification device monitors the photo obtained by the photographing device and conducts a two-dimensional codes identification processing of said photo, and shows the identified two-dimensional codes information. So that it realizes that when the people are taking photos by the photographing device in the mobile terminal, the two-dimensional codes information contained in the photo can be quickly identified, and shown on the display screen of the mobile terminal. The present invention has characters of easy and convenient operation, high identification rate of two-dimensional codes, good error correcting ability, and good adaptation and etc.

Embodiment 3

Figure 7:
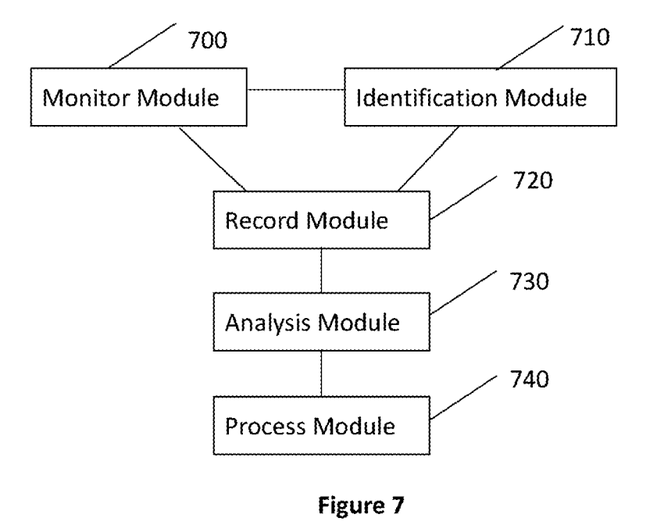
FIG. 7 shows a concrete structural illustration of the device for processing the visual graphics codes by a mobile terminal according to embodiment 3 of the present invention.

The present embodiment provides a device for processing visual graphic codes of a mobile terminal, the concrete structural illustration of which as shown in FIG. 7 comprises:

a monitor module 700, is configured to monitor an action of shooting or recording digital images by the mobile terminal;

an identification module 710, is configured to identify a focusing action during the process of shooting or recording the digital images by the mobile terminal;

a record module 720, is configured to record the digital images obtained after the mobile terminal finishes the focusing action;

an analysis module 730, is configured to analyse the digital images obtained after the focusing action, and to obtain visual graphics codes of the digital images;

a process module 740, is configured to decode the visual graphics codes, and to process the decoded information obtained after decoding.

Said monitor module 700, is concretely configured to monitor whether the mobile terminal starts a task of shooting or recording; and/or to monitor a procedure of shooting or recording by the mobile terminal.

Said identification module 710, is configured to identify whether a marking event of the focusing action appears during the process of shooting or recording the digital images; if such event appears, then to determine that the focusing action is caused during the process of shooting or recording the digital images by the mobile terminal;

or, to identify whether the focusing information confirmed by the user is received during the process of shooting or recording the digital images. If such information is received, then to determine that the focusing action is caused during the process of shooting or recording the digital images by the mobile terminal.

The focusing action comprises: to focus a designated focusing point, or, to auto-focus.

Said recode module 720, is configured to inform the shooting or recording device to shoot or record the objects after the focusing action finishes, and to store the corresponding digital images;

or, to store the digital images obtained after the shooting or recording device finishes the focusing action;

or, to grasp the digital images from the screen of the shooting or recording device after it finishes the focusing action, and to store the digital images.

Said digital images comprise pictures or videos.

Said analysis module 730, is configured to detect whether a positioning graphics of the visual graphics codes exists in the digital images obtained after the focusing action is finished;

if the positioning graphics exists, then to obtain location information of the visual graphics codes according to the location information of the positioning graphics; and according to the locating information of the visual graphics codes, to extract the visual graphics codes from the digital images.

Said analysis module 730, is configured to resolve the video obtained after the focusing action, and to obtain the resolved video frames;

concretely, the visual graphics codes in the obtained digital images are the visual graphic codes obtained from the resolved several video frames.

Said process module 740, is configured to decode the visual graphics codes, and to obtain the decoded information after decoding; to classify the decoded information, and to process the decoded information according to the classification of the decoded information.

Embodiment 4

Figure 8:
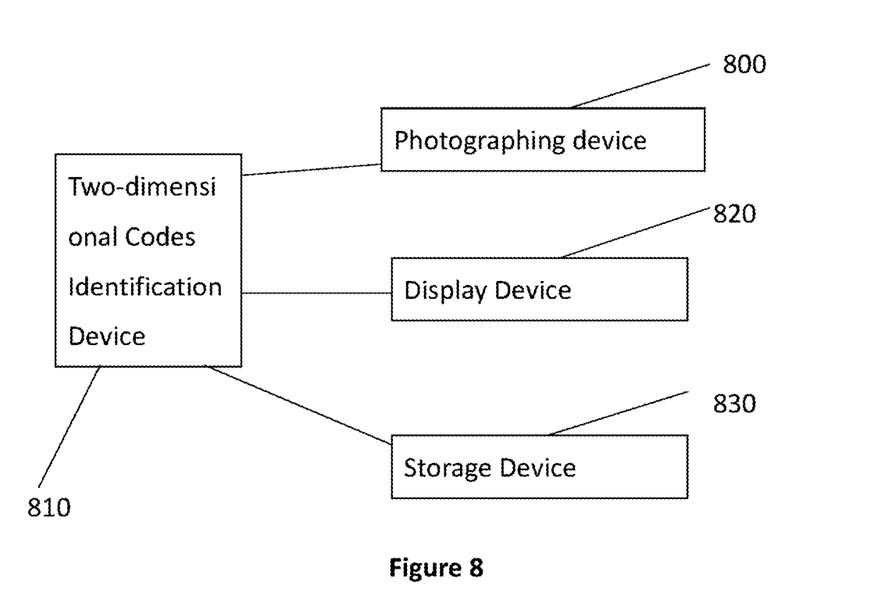
FIG. 8 shows a concrete structural illustration of the device for processing the two-dimensional codes by a mobile terminal according to embodiment 4 of the present invention.

The present invention provides a device for processing two-dimensional codes information by a mobile communication terminal. Said device is set in the mobile communication terminal, a concrete structural illustration of which as shown in FIG. 8 comprises: a photographing device 800, a two-dimensional codes identification device 810, a display device 820, and a storage device 830.

Said photographing device 800 is configured to connect to said two-dimensional codes identification device 810 to obtain a photo through a photographing.

Said two-dimensional codes identification device 810, is configured to monitor said photo, and to conduct two-dimensional codes identification processing to the photo according to pre-set two-dimensional codes. When the two-dimensional codes information is identified as being comprised I the photo information, said two-dimensional codes information is sent to said display device 820.

Said display device 820, is configured to display said two-dimensional codes information through a display window.

Said storage device 830, is configured to store said photo information obtained by said photographing device and said two-dimensional codes information obtained by said two-dimensional codes identification device.

Concretely, said two-dimensional codes identification device 810, is concretely configured to conduct real time monitoring of the storage address of the corresponding picture file of the photographing device. When the two-dimensional codes identification device 810 monitors that a new picture file is added to said storage address, it will regard said new picture file as a monitored picture file;

or, is concretely configured to conduct real time monitoring of the system activities of a mobile terminal. When the two-dimensional codes identification device 810 monitors that the photographing device 800 finishes the activity process of staring, taking a photo, and storing the picture file, it will regard the newly stored picture file by the photographing device 800 as the monitored picture file;

or, is concretely configured to conduct real time monitoring of the display screen of the photographing device. When the two-dimensional codes identification device 810 monitors that the display screen of the photographing device starts, and said photo on the display screen is kept for a set duration, it will regard the photo on the display screen as the monitored picture file.

Concretely, said two-dimensional codes identification device 810, is concretely configured to conduct a pretreatment of a binary graphics of said photo to said photo. Said pretreatment comprises converting said photo into a grey graphics without any compressed format, and conducting a de-noise processing, and a binary processing to said grey graphics; and according to the location and graphics character information of the positioning graphics of the preset two-dimensional codes, detecting whether the positioning graphics of the two-dimensional codes exists in the binary graphics; and if the positioning graphics exists, positioning the positioning graphics of the two-dimensional codes in the binary graphics, and determining the location and direction of the two-dimensional codes in said photo and obtaining the two-dimensional codes graphics according to the positioned positioning graphics; and extracting two-dimensional codes information from said two dimensional codes graphics; otherwise, determining said photo does not comprise a two-dimensional codes graphics.

Concretely, said two-dimensional codes identification device 810, is concretely configured to conduct detections of said binary graphics in horizontal and vertical directions, to detect whether 3 positioning graphics of said two-dimensional codes exist in said binary graphics; if 3 positioning graphics exists, then to obtain 3 location detection areas in said photo, and to mark the coordinates of the center points of said 3 location detection areas;

according to the locations and the coordinates of the center points of said 3 location detection areas, the coordinates of the center points of the two-dimensional graphics can be calculated; and according to the level of link, the deflection angle of the vertical direction of the center points of 3 positioning graphics, the direction of the two-dimensional codes graphics can be determined;

according to the coordinates of the center points of said two-dimensional codes graphics and the direction of said two-dimensional codes graphics, the two-dimensional codes graphics can be extracted from said photo, and the two-dimensional codes information can be extracted from said two-dimensional codes graphics.

Said device may comprise mobile communication terminals, or tablets or digital cameras.

Generally, the present invention can monitor and identify the focusing action during the process of shooting or recording digital images by a mobile terminal, record and analyse the obtained digital images after the mobile terminal finishes the focusing action, and efficiently and conveniently obtain the visual graphics coding of the digital images caused by the focusing action. The present invention can avoid complicated operations of re-installing a visual graphics coding software, and opening the visual graphics coding software by the user. The present invention can solve the problems such as the visual graphics coding software needs to adapt different types of mobile terminals, such as mobile communication terminals, and etc.; the visual graphics coding software lacks a function of autofocusing; and the identification operation of the visual graphics coding can be easily failed.

The present invention fully keeps the very natural habit from the user to open the self-shooting or recording device of the mobile terminal to shoot or record, and can fully utilize the photography and focus ability of the shooting or recording device, so as to improve the quality problem of the graphics which is taken during the photographing process and comprises the visual graphics coding such as two-dimensional codes. The present invention has advantages effects, such as convenient and easy operation, high identification rate of the visual graphics coding, such as two-dimensional codes, good ability of correcting errors, and good ability of adaptation, etc.

The algorisms and presentations do not fixed relate to any particular computer, visual system or other devices. Each general purpose system can be used together with the teaching herein. According to the above description, it is obvious to construct the structure required by this type of system. Additionally, the present invention does not direct to particular programming languages. It should be noted that, different types of programming languages can realize the contents of the present invention. And the above description based on special language is the best implementation which discloses the present invention.

The description provided hereinto describes a lot of concrete details. However, it can be understood that the embodiments of the present invention can be practices without these concretely details. In some embodiments, common methods, structures and technologies are not shown in detail, in order not to make the understanding of the present description unclear.

Similarly, it should be understood that in order to simplify the disclosure and help understanding one or more aspects of the invention, in the above mentioned exemplary descriptions of the embodiments of the present invention, each character some times are classified into each embodiment, figure, or descriptions of them. Whereas, such way of disclosure should not be interpreted as reflections of the following purposes: i.e. the present invention sought for protection has more characters than the definitely described characters in each of the claims. More accurately, as shown in the below claims, the invention lies in comprising less characters then the previously disclosed single embodiment. Thus, the claims which comply with the concrete embodiments are thus definitely comprised in that concrete embodiments, wherein each claim itself is a single embodiment of the present invention.

The person skilled in the art can also understand, and can self adaptively change the module of the device in the embodiments and set them to one or more devices which is different from the embodiment, and can combine a module or a unit or an assembly based the modules, units or assemblies, and can additionally divide them into different submodules, subunits or sub-assemblies. Except that such characters and/or process or at least some of the units are mutually exclusive, the person skilled in the art can adopt any composition to combine all the disclosed characters, and any process or units of any method or device so disclosed in the description (comprising the corresponding claims, abstract and figures). Except for any definite specification, each character disclosed in the present description (comprising the corresponding claims, abstracts, and figures) can be replaced by replacement character with same, corresponding or similar purpose.

Additionally, the person skilled in the art can understand that, although some of said embodiments comprise certain characters rather than other characters in other embodiments. Composition of characters from different embodiment indicates that it is within the scope of the present invention and constitutes different embodiments. For example, any one of the embodiments sought for protection of can be used as any way of composition in the following claims.

Each component embodiment in this invention may be realized as hardware, or as software module run in one or multiple CPU, or a combination of them. Those skilled in the art shall appreciate that, in practice, some or all functionalities of some or all components of the mobile terminal calling request message processing equipment according to the embodiments of this invention can be realized by using a microprocessor or Digital Signal Processor (DSP). This invention may be realized as device or equipment programs that execute part of or all methods described herein (for example, computer program and computer program product). Such program to realize this invention may be stored in a computer readable medium, or in a form of one or multiple signals. Such signals may be downloaded from websites in the internet, or be provided in a carrier signal, or be provided as any other forms.

Figure 9:
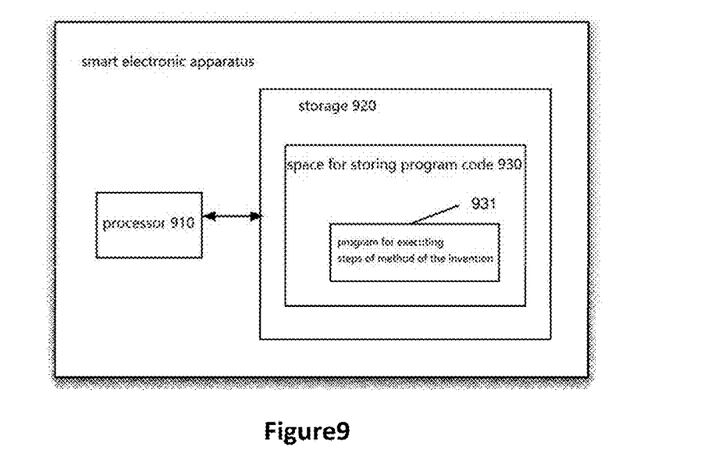
FIG. 9 shows a block diagram of a smart electronic apparatus for executing the method according to the invention.
Figure 10:
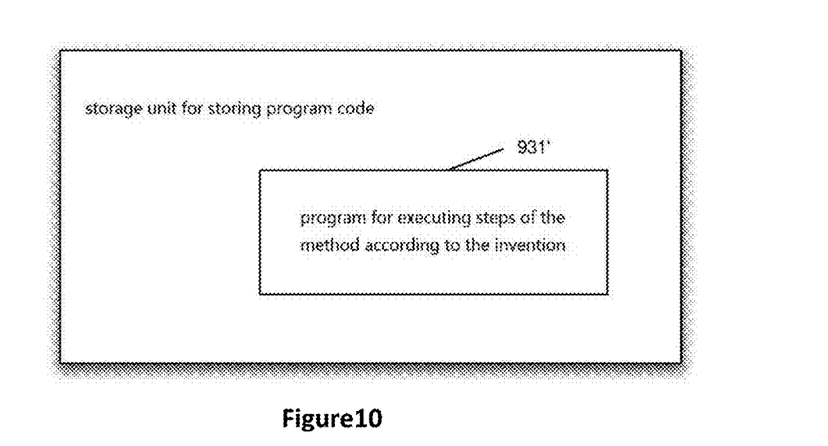
FIG. 10 shows a schematic diagram of a storage unit for storing or carrying the program code according to the method of the invention.

For example, FIG. 9 shows a smart electronic apparatus which may achieve the method for processing the visual graphics codes by a mobile terminal according to the invention. The smart electronic apparatus conventionally includes a processor 910 and a computer program product or computer readable medium in the form of a storage 920. The storage 920 may be electronic storage such as a flash memory, an EEPROM (Electrically Erasable Programmable Read-Only Memory), EPROM (Electrically Programmable Read-Only-Memory), hard disk or ROM (read-only memory). The storage 920 has a storage space 930 for storing program code for executing any of the steps in the above method. For example, the storage space 930 for storying the program code may include each program code 931 for realizing steps in the above methods respectively. The program code may be read out from one or more computer program product or write in one or more computer program product. The computer program product includes program code carrier such as hard disk, compact disk (CD), storage card, or soft disk. The computer program product is usually a portable or non-portable storage unit shown in FIG. 10. The storage unit may have similar-arranged memory paragraph, memory space and the like as the storage 920 of the movable terminal FIG. 9. The program code may be, for example, compacted in appropriate form. Generally, the storage unit includes a computer readable code 931', that is, the code which may be read by processor such as the processor 910. When the program code is executed by the smart electronic terminal, the smart electronic terminal is made to execute the steps in the methods above.

It should be noted that the above-described embodiments of the present invention will be described the present invention rather than limiting, and that those skilled in the art without departing from the scope of the appended claims may be devised alternative embodiments. In the claims, any reference signs located between parentheses should not be configured to restrict the claims. The word "comprising" does not exclude the presence of elements or steps that not listed in the claims. Located element before the word "one" or "one" does not exclude the existence of a plurality of such elements. The present invention may be by means of hardware comprising several distinct elements, and by means of a suitably programmed computer to achieve. In enumerating several means of unit claim, several of these means may be embodied by the same item of hardware. Word first, second, and third, etc. does not denote any order. These words can be interpreted as names.

The invention claimed is:

1. A method for processing the visual graphics codes of a mobile terminal, comprising:
   monitoring an action of shooting or recording digital images by the mobile terminal;
   identifying a focusing action during the process of shooting or recording the digital images by the mobile terminal;
   recording the digital images obtained after the mobile terminal finishes the focusing action;
   analyzing the digital images obtained after the focusing action is finished, and obtaining visual graphics codes in the digital images, wherein the analyzing the digital images obtained after the focusing action is finished, and obtaining visual graphics codes of the digital images comprise:
      detecting whether a positioning graphics of the visual graphics codes exists in the digital images obtained after the focusing action is finished,
      if the positioning graphics exists, then obtaining locating information of the visual graphics codes according to the locating information of the positioning graphics, and according to the locating information of the visual graphics codes, extracting the visual graphics codes from the digital images; and decoding the visual graphics codes, and processing decoded information obtained after decoding.

2. The method according to claim 1, wherein the monitoring the action of shooting or recording digital images by the mobile terminal comprises at least one of:

monitoring whether the mobile terminal starts a task of shooting or recording;

monitoring the procedure of shooting or recording by the mobile terminal.

3. The method according to claim 1, wherein the identifying the focusing action during the process of shooting or recording the digital images by the mobile terminal comprises:

identifying whether a marking event of the focusing action appears during the process of shooting or recording the digital images; if such event appears, then determining that the focusing action is caused during the process of shooting or recording the digital images by the mobile terminal; or, identifying whether focusing information confirmed by the user is received during the process of shooting or recording the digital images, if such information is received, then determining that the focusing action is caused during the process of shooting or recording the digital images by the mobile terminal.

4. The method according to claim 1, wherein the focusing action comprises: focusing a designated focusing point, or, auto-focusing.

5. The method according to claim 1, wherein the recording the digital images obtained after the mobile terminal finishes the focusing action comprises:

informing the shooting or recording device to shoot or record the objects after the focusing action finishes, and storing the corresponding digital images;

storing the digital images obtained after the shooting or recording device finishes the focusing action; or grasping the digital images from the screen of the shooting or recording device after it finishes the focusing action, and storing the digital images.

6. The method according to claim 1, wherein the digital images comprise pictures or videos.

7. The method according to claim 1, wherein when the digital images are a video, the analyzing the digital images information obtained after the focusing action is finished further comprises: resolving the video obtained after the focusing action is finished, and obtaining the resolved video frames;

the visual graphics codes in the obtained digital images are specifically the visual graphic codes obtained from the resolved several video frames.

8. The method according to claim 1, wherein the decoding the visual graphics codes, and processing the decoded information obtained after decoding comprises:

decoding the visual graphics codes, and obtaining the decoded information after decoding;

classifying the decoded information, and processing the decoded information according to the classification of the decoded information.

9. A mobile terminal for processing visual graphic codes, comprising:

a memory having instructions stored thereon;

a processor configured to execute the instructions to perform operations to process visual graphics codes, the operations comprising:

monitoring an action of shooting or recording digital images by the mobile terminal;

identifying a focusing action during the process of shooting or recording the digital images by the mobile terminal;

recording the digital images obtained after the mobile terminal finishes the focusing action;

analyzing the digital images obtained after the focusing action is finished, and obtaining visual graphics codes in the digital images, wherein the analyzing the digital images obtained after the focusing action is finished, and obtaining visual graphics codes of the digital images comprise:

detecting whether a positioning graphics of the visual graphics codes exists in the digital images obtained after the focusing action is finished, if the positioning graphics exists, then obtaining locating information of the visual graphics codes according to the locating information of the positioning graphics, and according to the locating information of the visual graphics codes, extracting the visual graphics codes from the digital images; and decoding the visual graphics codes, and processing the decoded information obtained after decoding.

10. The mobile terminal according to claim 9, wherein the monitoring the action of shooting or recording digital images by the mobile terminal comprises at least one of:

the monitor module is configured to monitoring whether the mobile terminal starts a task of shooting or recording;

monitoring the procedure of shooting or recording by the mobile terminal.

11. The mobile terminal according to claim 9, wherein the identifying the focusing action during the process of shooting or recording the digital images by the mobile terminal comprises:

identifying whether a marking event of the focusing action appears during the process of shooting or recording the digital images; if such event appears, then determining that the focusing action is caused during the process of shooting or recording the digital images by the mobile terminal; or, identifying whether focusing information confirmed by the user is received during the process of shooting or recording the digital images, if such information is received, then determining that the focusing action is caused during the process of shooting or recording the digital images by the mobile terminal.

12. The mobile terminal according to claim 9, wherein the focusing action comprises: focusing a designated focusing point, or, auto-focusing.

13. The mobile terminal according to claim 9, wherein the recording the digital images obtained after the mobile terminal finishes the focusing action comprises:

informing the shooting or recording device to shoot or record the objects after the focusing action finishes, and storing the corresponding digital images;

storing the digital images obtained after the shooting or recording device finishes the focusing action; or grasping the digital images from the screen of the shooting or recording device after it finishes the focusing action, and storing the digital images.

14. The mobile terminal according to claim 9, wherein the digital images comprise pictures or videos.

15. The mobile terminal according to claim 9, wherein the analyzing the digital images information obtained after the focusing action is finished, and obtaining visual graphics codes of the digital images further comprises:
    resolving the video obtained after the focusing action is finished, and obtaining the resolved video frames;
    the visual graphics codes in the obtained digital images are specifically the visual graphic codes obtained from the resolved several video frames.

16. The mobile terminal according to claim 9, wherein the decoding the visual graphics codes, and processing the decoded information obtained after decoding comprises:
    decoding the visual graphics codes, and obtaining the decoded information after decoding;
    classifying the decoded information, and processing the decoded information according to the classification of the decoded information.

17. A non-transitory computer readable medium, having computer programs stored thereon that, when executed by one or more processors of a mobile terminal, cause the mobile terminal to perform:
    monitoring an action of shooting or recording digital images by the mobile terminal;
    identifying a focusing action during the process of shooting or recording the digital images by the mobile terminal;
    recording the digital images obtained after the mobile terminal finishes the focusing action;
    analyzing the digital images obtained after the focusing action is finished, and obtaining visual graphics codes in the digital images, wherein the analyzing the digital images obtained after the focusing action is finished and obtaining visual graphics codes of the digital images further comprise:
        detecting whether a positioning graphics of the visual graphics codes exists in the digital images obtained after the focusing action is finished,
        if the positioning graphics exists, then obtaining locating information of the visual graphics codes according to the locating information of the positioning graphics, and
        according to the locating information of the visual graphics codes, extracting the visual graphics codes from the digital images; and
    decoding the visual graphics codes, and processing decoded information obtained after decoding.

18. The non-transitory computer readable medium according to claim 17, wherein the monitoring the action of shooting or recording digital images by the mobile terminal comprises at least one of:
    monitoring whether the mobile terminal starts a task of shooting or recording;
    monitoring the procedure of shooting or recording by the mobile terminal.

* * * * *